Feb. 10, 1970    T. M. GAFFEY ET AL    3,494,706
IN-PLANE OUT-OF-PLANE FLAPPING PROP-ROTOR FREQUENCY DECOUPLING
Filed Aug. 28, 1967      3 Sheets-Sheet 1

INVENTOR
TROY M. GAFFEY
KENNETH G. WERNICKE

ATTORNEY

INVENTOR
TROY M. GAFFEY
KENNETH G. WERNICKE

ATTORNEY

United States Patent Office 3,494,706
Patented Feb. 10, 1970

3,494,706
IN-PLANE OUT-OF-PLANE FLAPPING PROP-
ROTOR FREQUENCY DECOUPLING
Troy M. Gaffey and Kenneth G. Wernicke, Hurst, Tex.,
assignors to Bell Aerospace Corporation, Hurst, Tex.,
a corporation of Delaware
Continuation-in-part of application Ser. No. 637,539,
May 10, 1967. This application Aug. 28, 1967, Ser.
No. 671,907
Int. Cl. B64c 27/52, 27/60
U.S. Cl. 416—102
12 Claims

ABSTRACT OF THE DISCLOSURE

In an aircraft having a flapping blade prop-rotor operable in an airplane configuration at high forward speeds, in-plane and out-of-plane rotor frequencies are decoupled by employing negative delta-3 to cause the blade pitch angle to increase when the blade flaps forward.

The invention

This is a continuation-in-part of the application of Troy M. Gaffey and Kenneth G. Wernicke, Ser. No. 637,539, filed May 10, 1967.

This invention relates to stabilization of flapping prop-rotors when employed in the airplane configuration at high forward speeds. In a more specific aspect, the invention relates to the use of negative delta-3 at the cyclic input to the rotor. In a more specific aspect, the invention relates to the use of a negative delta-3 which is greater tthan zero and not greater than about 45° to cause the blade pitch angle to increase when the blade flaps forward.

Prior art

Flapping prop-rotor systems are employed in aircraft which are to be converted from a helicopter configuration to an aircraft configuration. Many difficult problems have heretofore been encountered and overcome in the conversion itself. Beyond this, special problems centered around the use of a flapping prop-rotor, in high speed forward flight have been encountered. In particular, it has been found that for some systems, stable operation obtains until a given relatively high forward speed is reached. At such speed, severe instability is encountered, of such nature as to lead to destruction of the aircraft if not eliminated.

It has been determined that such instability is involved with the relationship of the effective in-plane and out-of-plane frequencies of the rotor blade. Specifically, under the circumstances of high air inflow through the prop-rotor at advanced forward speeds, when the rotor blade in-plane and out-of-plane frequencies are substantially equal, it has been found that motion of the rotor blade in one plane will couple with blade motion in the other plane so as to provide negative damping to the original disturbing motion and result in major instability of the rotor.

One in-plane frequency of a flapping blade prop-rotor may be understood to be the natural frequency at which a blade will vibrate or oscillate if the end of the blade as attached to a fixed hub is stressed by application of a force in the plane of blade rotation and released to return to a non-stressed position. With the blade semi-rigidly attached to a fixed hub, the blade will oscillate at a natural frequency depending upon its structural characteristic in the plane of blade rotation.

An out-of-plane frequency is the frequency at which the blade will naturally flap or oscillate as a pendulum relative to its pivotal connection to the mast.

The in-plane and out-of-plane frequency stability of prop-rotor blades during airplane operation is found to be a function of the translational speed of the aircraft and of the rotor blade pitch-flap coupling.

Summary

In accordance with the present invention, an aircraft having a pylon-supported flapping prop-rotor which is to be employed in an airplane configuration at high forward speeds is stabilized. More particularly, in accordance with the invention, there is provided a swashplate which is coupled to the pylon in a predetermined positional relation. Links are then provided between the swashplate and each blade of the rotor for increasing the blade pitch angle when the blade flaps forward. In a more specific aspect, the invention involves a swashplate to rotor coupling with negative delta-3 preferably greater than zero and not greater than about 45°.

The drawings

For a more complete understanding of the present invention, reference may now be had to the following description taken in conjunction with the accompanying drawings in which.

The preferred embodiments

Figure 1A:
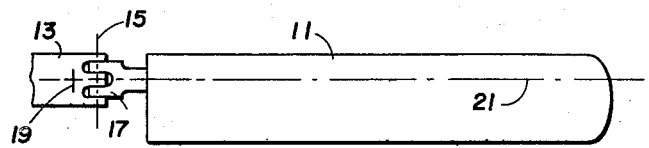
FIGURE 1a illustrates a rotor blade with no pitch-flap coupling.

Referring now to the drawings, and particularly to FIGURES 1a–1d, negative and positive pitch-flap coupling, which may be referred to as positive and negative delta-3, respectively, will first be described. FIGURES 1a–1d are plan views of rotor hubs and blades.

Zero pitch-flap coupling is a coupling in which there is no induced pitch change on the rotor blade as a result of blade flapping. Negative pitch-flap coupling is a coupling in which blade pitch is decreased under the effect of increased load, or forward flapping, and decreased under the effect of lesser load, or backward flapping. Positive pitch-flap coupling is a coupling in which the blade pitch is increased under the effect of increased load, or forward flapping, and it is decreased under the effect of decreased load, or backward flapping.

Figure 1B:
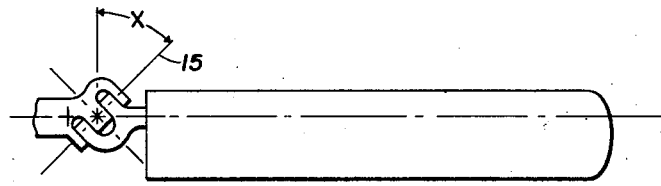
FIGURES 1b and 1c illustrate rotor blades with negative pitch-flap coupling.
Figure 1C:
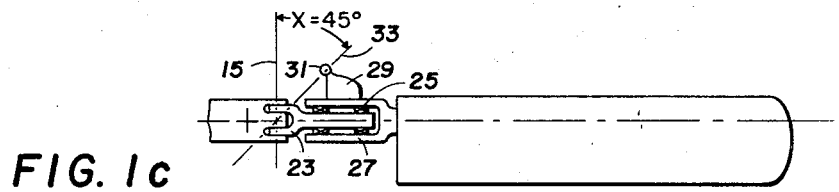
Figure 1D:
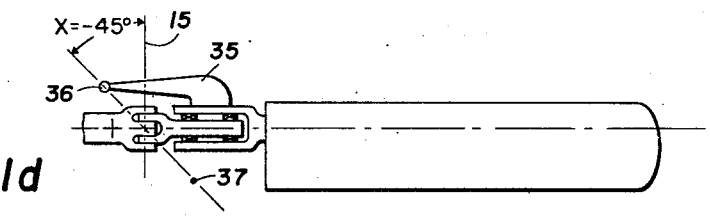
FIGURE 1d shows a rotor blade with positive pitch-flap coupling.

FIGURES 1a and 1b illustrate couplings to rotor blades that do not have rotor blade pitch horns, while FIGURES 1c and 1d illustrate couplings to rotor blades employing pitch horns.

Referring to FIGURE 1a, the blade 11 is flappingly connected to hub 13 along flapping axis 15 by means of extension 17 to which the blade is rigidly connected. That is, the blade 11 can flap relative to hub 13 out of the plane of rotation. However, as to the plane of rotation, the blade 11 is rigidly secured to the hub 13. Hub and rotor blade rotate around the center line of the rotor mast 19 as do all of the rotor blades that may constitute the particular rotor. Flapping of the rotor blade 11 will be understood to be in and out of the plane of the paper.

It will be evident that when the flapping axis 15 is perpendicular to the longitudinal axis 21 of the rotor blade, flapping of the blade will not induce a pitch change and hence the configuration illustrated in FIGURE 1a has zero pitch-flap coupling or no delta-3.

In FIGURE 1b, the flapping axis 15 is angularly displaced with respect to the blade in an amount of 45°. This configuration has negative pitch-flap coupling or a delta-3 equal to angle X. The change in blade pitch, $\Delta\theta$, per degree of flapping, $\Delta\beta$, is measured by the tangent of the angle X, i.e., the ratio $\Delta\theta/\Delta\beta$, is equal to tangent X. If, for example, the angle X illustrated in FIGURE 1b were to be 45°, then for each degree in the angle of forward flapping of the rotor blade there would be one degree reduction in blade pitch angle. This relation obtains because the tangent of 45° is equal to one.

When the axis has the position of axis 15, FIGURE 1b, the blade pitch angle decreases with forward flapping. This is positive delta-3, or negative pitch-flap coupling.

In FIGURE 1c, the blade is attached to extension 23 through bearings 25 located within a conventional blade grip 27. A pitch horn 29 extends from grip 27. For controlled pitch change by the pilot, a pitch horn 29 is actuated to rotate the blade 11 and grip 27 on bearings 25 to increase or decrease the blade pitch angle. In the helicopter configuration, cyclic pitch is introduced through the pitch horn 29. In the airplane configuration, and with respect to blade flapping and pitch coupling thereto, it will be understood that the attachment point 31 of the pitch horn 29 to the flight control system (not shown) is considered to be fixed in position. Consequently, flapping of the blade 11 and grip 27 around flapping axis 15 will induce rotation of the blade and grip around the bearings 25 by virtue of the positioning of point 31. In this configuration, i.e., with blade pitch horns, it is not only the relative positioning of the flapping axis to the blade longitudinal axis that determines the extent, if any, of delta-3, but also the positioning of line 33 between the blade longitudinal axis and the flapping axis 15.

In FIGURE 1d, the pitch horn 35 extends beyond the flapping axis 15 to coupling point 36. Forward flapping of the rotor blade will induce an *increase* in pitch of the blade as opposed to the *decrease* of pitch that will occur in FIGURE 1c with forward flapping.

It will also be readily appreciated that a pitch horn (not shown) attached to the trailing edge side of the rotor blade could be coupled at point 37. In the latter case, the forward flapping would also cause an increase in blade pitch and thus serve as a negative delta-3 coupling point.

Figure 2:
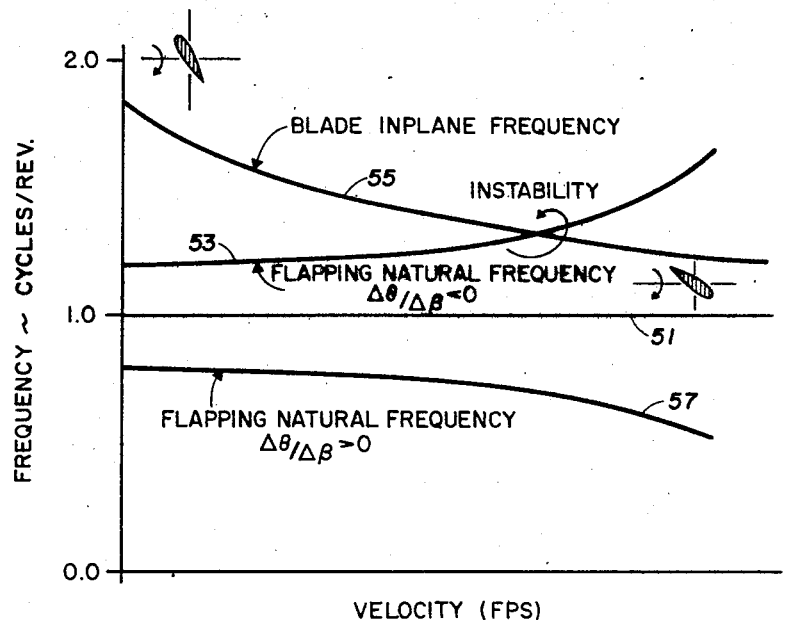
FIGURE 2 is a graph showing the relationship between frequency and forward velocity for both in-plane and out-of-plane movements of the rotor blade.

The flap-lag instability of the prop-rotor operating in the airplane configuration at advanced forward speeds may be further understood by reference to FIGURE 2. The ordinates represent the frequency of the rotating blade in cycles per revolution. The abscissa represent the forward velocity of the aircraft in feet per second.

A freely flapping rotor blade, unfettered in its flapping freedom by any one of delta-3, hub spring restraint, off-set flapping hinge or the like, will flap at a frequency equal to one cycle per revolution. This is represented by line 51 of FIGURE 2. Such a rotor will tend to have excessive steady state flapping. Excessive steady state flapping traditionally has been corrected by introducing positive delta-3 or negative pitch-flap coupling. That is, when the rotor blade flaps forwardly, the pitch of the rotor blade decreases. A rotor with positive delta-3 will have a flapping frequency greater than one cycle per revolution. The flapping (out-of-plane) frequency of a blade employing positive delta-3 increases with advancing forward speed of the aircraft. This is because the spring-like effect of the delta-3 becomes more effective with the increasing airloads accompanying the advanced forward speeds. Thus, the natural flapping frequency of a rotor blade employing positive delta-3, i.e., the ratio $\Delta\theta/\Delta\beta$ is less than zero, is represented by curve 53 of FIGURE 2.

In contrast, and considering a semi-rigid rotor configuration wherein no lead-lag hinge is provided, the blade in-plane frequency at the lower forward speeds will be in the region of two cycles per revolution and will decrease with increasing forward speed in the manner shown by curve 55.

Thus, at some advanced forward speed, the two curves 53 and 55 will cross. This means that at or about one particular speed, the rotor blade flapping and the in-plane frequencies are approximately equal.

The in-plane frequency of a rotor blade decreases with increased forward speed as shown by curve 55. This is because the pitch angle of the blade must be proportionately increased in order to provide the increased velocity. Such increase in collective pitch angle results in the blade being made effectively "softer" in the in-plane direction, thus decreasing its natural frequency in that plane.

Curve 53 thus represents the increasing out-of-plane blade frequency with increasing forward speed. Similarly, curve 55 represents the decreasing in-plane frequency with increasing forward speed. Curves 53 and 55 intersect at advanced forward speeds. As previously noted, the coupling of these frequencies tends to make the rotor unstable at or about the forward speed at which the curves intersect.

In order to avoid the instability resulting from the in-plane and out-of-plane frequency coupling, rotor blades with sufficient in-plane stiffness have been proposed to displace curve 55 sufficiently upwardly with relation to curve 53 so that the intersection between the two curves will take place only at a speed beyond the speed capabilities of the aircraft. However, such construction poses significant problems, including that of increased weight. It has not been considered to be a solution to the problems.

It has been determined that a most effective solution to this instability problem is to provide the rotor blades with a negative delta-3, i.e., positive pitch-flap coupling in which the pitch angle, $\Delta\theta$, of the rotor blade increases with forward flapping of the rotor blade. This is accomplished in one embodiment in the manner illustrated in FIGURE 1d where X=—45° and $\Delta\theta/\Delta\beta$ is greater than zero.

By employing negative delta-3 as shown by FIGURE 2, curve 57 never will cross curve 55. Curve 57 represents the frequency characteristic of a rotor blade employing negative delta-3. At the low speeds, the rotor blade flapping frequency is less than one cycle per revolution. The frequency decreases with advancing forward speed, thus avoiding intersection with curve 55.

Figure 3:
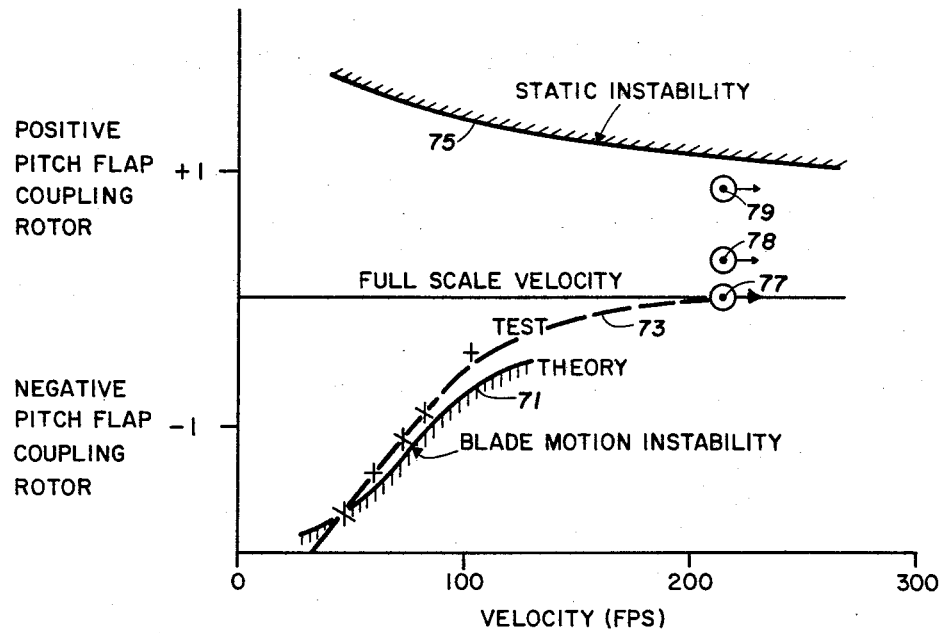
FIGURE 3 illustrates the results of tests of operation of a flapping prop-rotor with various degrees of negative delta-3.

The graph of FIGURE 3 further illustrates the effect of the introduction of positive pitch-flap coupling or negative delta-3. This graph is a plot of the tangent of angle X, FIGURES 1b–1d, as a function of velocity. The data was obtained in full scale wind tunnel tests at speeds up to around 200 miles per hour.

The theoretical or computed boundary of instability of a rotor employing various degrees of negative pitch-flap coupling is indicated by curve 71. Actual test points are indicated on curve 73. It will be apparent that the test unit, designed to simulate a practical prop-rotor construction, was operating on the boundary of instability in following curve 73.

When positive pitch-flap coupling was employed, however, the stability boundary is defined by static instability curve 75. Test points 77, 78, and 79 for a configuration indicating that stability was assured at advanced translational speeds only with positive pitch-flap coupling.

To insure stability of operation at all forward speeds the positive pitch-flap coupling should be limited as expressed by the formula:

$$\frac{\Delta\theta}{\Delta\beta} \leq \frac{\frac{8}{\gamma}\cos\phi}{\left[\frac{1}{(1+K_H/I_b\Omega^2)} - \frac{K_m}{W\psi^2}\left[\frac{\bar{R}\tan\phi}{b\cos\phi}\right]\right]} \quad (1)$$

$$\frac{\Delta\theta}{\Delta\beta} > 0$$

where:

$W\psi$ is the blade fundamental in-plane frequency in cycles per rotor revolution,
$\Omega$ is the rotor speed in radians per second,
$I_b$ is the blade flapping inertia in slug-ft.$^2$,
$K_H$ is the blade flapping restraint in foot-pounds per radian,
$\gamma$ is the Blade Locke number,
$\bar{R}$ is 75% of the blade radius in feet,
$\phi$ is the air inflow angle at $\bar{R}$,
$b$ is the distance in feet from the blade virtual in-plane hinge to $\bar{R}$, and
$K_m$ is the blade "hub rock" and ratio.

With the exception of the term "hub rock," the above terms will be readily understood by one skilled in the art of helicopter technology. The term "hub rock" refers to the tendency of a semi-rigidly mounted rotor blade to undergo elastic out-of-plane deflections as a result of elastic in-plane deflection. It is the ratio of the elastic out-of-plane deflection $\beta_E$ at the inboard end of a blade 11 to the in-plane deflection $\psi_E$ at a point that is 75% of the radial distance of the blade from the hub. It will be appreciated that a semi-rigid rotor construction provides for flapping of the rotor blades in and out of the plane of rotation (whether through real or virtual axis).

Figure 4:
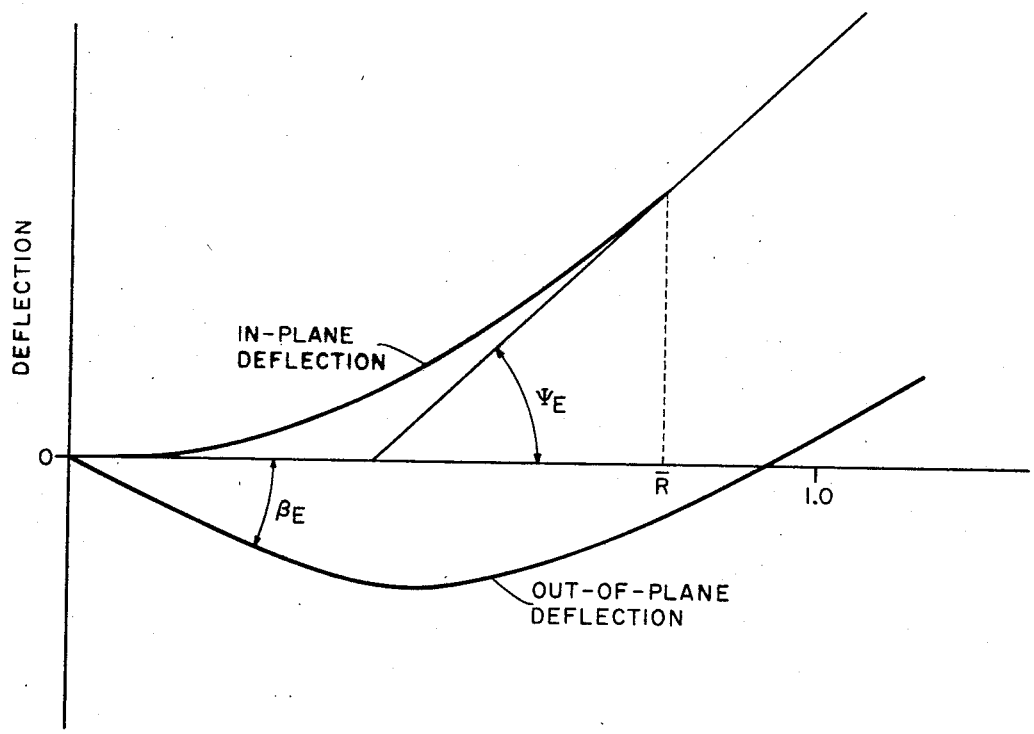
FIGURE 4 is a graph illustrating the relationship between in-plane and out-of-plane deflections along the span of a rotor blade.

The curves of FIGURE 4 illustrate the relationship between in-plane and out-of-plane deflection along the span of a rotor blade. "Hub rock" is the ratio $\beta_E/\psi_E$, that is, the ratio of the angle the out-of-plane deflection curve makes with the zero deflection line at the inboard end of a blade to the angle formed by a line that intersects the zero deflection line and is tangential to the in-plane deflection curve at $\bar{R}$. The effect of the "hub rock" ratio on pitch-flap coupling is readily apparent when it is appreciated that the elastic out-of-plane deflection $\beta_E$ of the blade 11 at the inboard section, including the blade pitch horn 29 with its attachment to a control pitch linkage, is considered equivalent to conventional flapping as was discussed with reference to FIGURE 1c.

When the ratio $\Delta\theta/\Delta\beta$ equals the expression given at (1) above, the tangent of angle X approaches the static instability curve 75 resulting in a rotor system of doubtful stability. On the other hand, as the ratio $\Delta\theta/\Delta\beta$ approaches zero, the rotor system appears to operate as with no pitch-flap coupling, as described with respect to FIGURE 1a. Thus, a preferred $\Delta\theta/\Delta\beta$ ratio is one wherein a margin of safety is provided between the instability curve 75 and operating points at all forward speeds; in addition, maximum positive pitch-flap coupling is provided. This ratio varies with the aircraft design.

Figure 5:
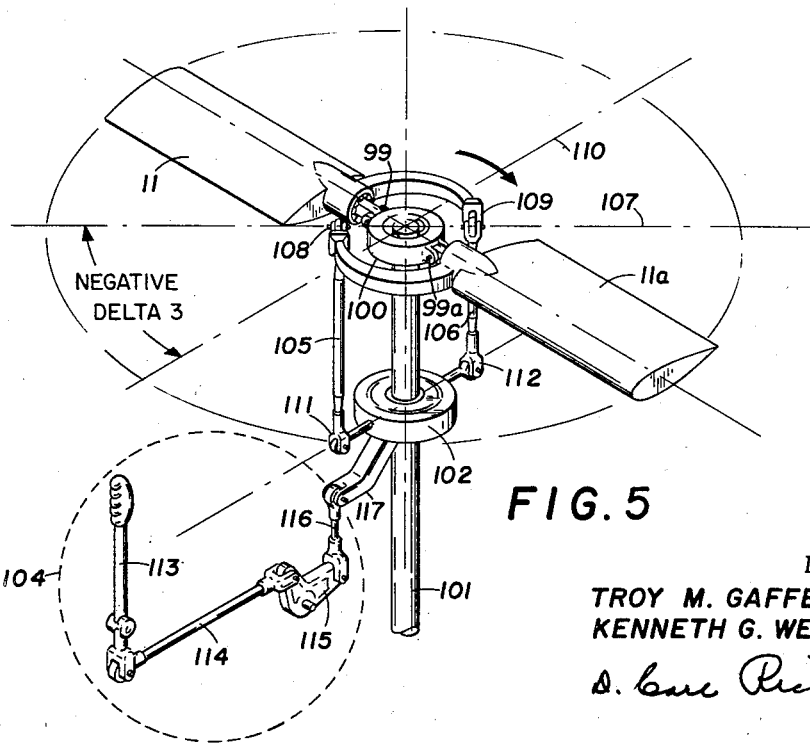
FIGURE 5 illustrates one form of linkage between a swashplate and rotor blades with negative delta-3.

Referring to FIGURE 5, which illustrates negative delta-3, blades 11 and 11a are pivotally supported at flapping pivots 99 and 99a, respectively, attached to a hub 100 at the end of mast 101. A swashplate 102 is supported on the mast 101 below hub 100. A control linkage 104 diagrammatically represents the non-rotating cyclic flight controls leading to the swashplate 102 which will include a cyclic control stick 113, control 114, lever 115, link 116, and swashplate attachment bracket 117.

Control tubes 105 and 106 are coupled between the swashplate 102 and the pitch horns on blades 11 and 11a, respectively.

In a rotor without delta-3, the attachment points 108 and 109 between control rods 105 and 106 and the pitch horns of blades 11 and 11a, respectively, would be located along axis 110 which is perpendicular to the axis of blades 11 and 11a.

In the present invention, negative delta-3 is introduced by locating attachment points along line 107. When the rotor blade 11, for example, flaps upwardly around its flapping pivot 99 it will be appreciated that, by virtue of the attachment point 109 being positioned on axis 107 instead of on axis 110, such upward flapping will attempt to move the point 109 downward. However, since the swashplate 102 is fixed, the pitch horn of blade 11 will rotate the blade thereby causing an increase in blade pitch. A downward flapping will cause an increase in blade pitch since it can be appreciated that the point 109 will have a downward directed force exerted thereon.

In FIGURE 5, the mast is shown vertical and the blades 11 and 11a rotating in a horizontal plane. This conventional helicopter configuration has been shown for convenience only. When converted to the airplane configuration, it will be understood that the blades 11 and 11a will be rotating in a vertical plane. In such case, flapping will be in the forward and backward directions and it is in this configuration where the negative delta-3 makes a contribution to stability.

Having described the invention in connection with certain specific embodiments thereof, it is to be understood that further modifications may now suggest themselves to those skilled in the art and it is intended to cover such modifications as fall within the scope of the appended claims.

What is claimed is:

1. In an aircraft having a semi-rigid pylon-supported flapping prop-rotor system convertible from a helicopter configuration to an airplane configuration for flight at high forward speeds, comprising:
   (a) means for pivotally mounting and driving the blades of said prop-rotor system with flapping motion relative to the pivotal mounting,
   (b) a swashplate coupled in a fixed position when operating said aircraft in an airplane configuration, and
   (c) cyclic pitch linkage coupling with negative delta-3 each blade of the prop-rotor system to the fixed position swashplate for increasing the blade pitch angle when the blade flaps forward to stabilize the prop-rotor system by decoupling the in-plane, out-of-plane frequencies.

2. The combination set forth in claim 1 wherein said linkage pivotally couples each blade at a point corresponding with negative delta-3 greater than zero and not greater than about 45°.

3. The combination set forth in claim 1 wherein each blade on said rotor is provided with a pitch horn for swashplate coupling, which pitch horn has a coupling point located on a radial line extending from the rotor axis and leading a radial line perpendicular to the blade axis.

4. The combination as set forth in claim 3 wherein the tangent of the angle between the coupling point radial line and the leading radial line is equal to the ratio of $\Delta\theta$ to $\Delta\beta$.

5. The combination as set forth in claim 4 wherein the ratio of $\Delta\theta$ to $\Delta\beta$ is not greater than:

$$\frac{8/\gamma \cos\phi}{\left[\frac{1}{(1+K_H/I_b\Omega^2)} - \frac{K_m}{W\psi^2}\left[\frac{\bar{R}\tan\theta}{b\cos\theta}\right]\right]}$$

6. The combination as set forth in claim 5 wherein the ratio of $\Delta\theta$ to $\Delta\beta$ is greater than zero.

7. In a semi-rigid flapping prop-rotor system convertible from a helicopter configuration to an airplane configuration for driving an aircraft at high forward speeds, the combination which comprises:
  (a) a drive mast extending from said aircraft,
  (b) a hub on said mast for pivotally mounting the blades of said rotor for flapping motion only relative to said hub,
  (c) a swashplate mounted on said mast,
  (d) a pitch horn for each blade in the prop-rotor system having a coupling point located on a radius extending from the mast axis which radius leads a radius perpendicular to the blade axis, and
  (e) cyclic pitch linkage coupling with negative delta-3 each pitch horn to said swashplate in a manner to increase the blade pitch angle as a result of the forward flapping of a blade of the prop-rotor system to thereby stabilize the prop-rotor system by decoupling the in-plane, out-of-plane frequencies.

8. The combination set forth in claim 7 wherein the angle between said radii is greater than zero and not greater than about 45°.

9. The combination set forth in claim 7 wherein the angle between said radii is about 45°.

10. The combination as set forth in claim 7 wherein the tangent of the angle between said radii is equal to the ratio of $\Delta\theta$ to $\Delta\beta$.

11. The combination as set forth in claim 10 wherein the ratio of $\Delta\theta$ to $\Delta\beta$ is not greater than:

$$\frac{8/8 \cos\phi}{\left[\frac{1}{(1+K_H/I_b\Omega^2)} - \frac{K_m}{W\psi^2}\left[\frac{\bar{R} \tan\phi}{b \cos\phi}\right]\right]}$$

12. The combination as set forth in claim 11 wherein the ratio of $\Delta\theta$ to $\Delta\beta$ is greater than zero.

References Cited

UNITED STATES PATENTS

| | | | |
|---|---|---|---|
| 2,627,929 | 2/1953 | Sikorsky | 170—160.25 |
| 2,670,051 | 2/1954 | Hohenenser | 170—160.25 |
| 2,997,110 | 8/1961 | Adler | 170—160.25 X |

FOREIGN PATENTS 1,213,762  11/1959  France.

EVERETTE A. POWELL, JR., Primary Examiner

U.S. Cl. X.R.
244—7; 416—104